(12) United States Patent
Martens et al.

(10) Patent No.: US 7,213,675 B2
(45) Date of Patent: May 8, 2007

(54) METHOD AND SYSTEM FOR ANTI-STATIC STEERING FOR VEHICLE STEERING SYSTEMS

(75) Inventors: John D. Martens, New Hudson, MI (US); Chester Gryczan, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 409 days.

(21) Appl. No.: 10/953,000

(22) Filed: Sep. 29, 2004

(65) Prior Publication Data

US 2006/0070791 A1    Apr. 6, 2006

(51) Int. Cl.
    *B62D 7/09* (2006.01)
(52) U.S. Cl. .................... 180/411; 180/410; 701/41
(58) Field of Classification Search ............. 180/410, 180/411, 408; 701/41
    See application file for complete search history.

(56) References Cited

U.S. PATENT DOCUMENTS

| 4,842,089 | A | | 6/1989 | Kimbrough et al. ....... 180/79.1 |
| 5,417,299 | A | * | 5/1995 | Pillar et al. ................. 180/412 |
| 5,607,028 | A | * | 3/1997 | Braun et al. ................ 180/408 |
| 6,546,324 | B1 | | 4/2003 | Chen et al. .................... 701/48 |
| 6,564,131 | B2 | | 5/2003 | Sebastian et al. ............. 701/41 |
| 6,640,171 | B2 | | 10/2003 | Chen et al. .................... 701/41 |
| 6,658,334 | B2 | | 12/2003 | Boswell et al. ............... 701/41 |
| 6,949,901 | B1 | * | 9/2005 | Collier-Hallman et al. . 318/432 |

* cited by examiner

*Primary Examiner*—Tony H. Winner
(74) *Attorney, Agent, or Firm*—Michael D. Smith

(57) ABSTRACT

A method for implementing anti-static steering for vehicle steering systems includes receiving a desired rear wheel angle input and receiving a vehicle speed input. An approved rear wheel angle output is generated using the desired rear wheel angle input and the vehicle speed input, wherein the approved rear wheel angle is based upon one of a plurality of defined operating states, the plurality of operating states including operation at a speed in a first range, operation at a speed in a second range, and transitions therebetween.

30 Claims, 4 Drawing Sheets

METHOD AND SYSTEM FOR ANTI-STATIC STEERING FOR VEHICLE STEERING SYSTEMS

BACKGROUND

The present invention relates generally to vehicle steering systems and, more particularly, to a method and system for anti-static steering for vehicle steering systems.

In vehicular applications, a typical four-wheel steering system steers both the front and the rear wheels of a vehicle. More specifically, a rear wheel steering portion of the four-wheel system may produce a desired rear wheel steering angle in order to improve directional stability at high speeds and maneuverability at low speeds. A high-speed steering method implemented with this system may reduce vehicle yaw by steering the front and rear wheels in the same direction, or in phase, and thereby improve vehicle safety. In contrast, a low speed steering method implemented with four-wheel steering may achieve tight turning radii at low speeds by steering the front and rear wheels in different directions, or out of phase, to thereby reduce the effective turning radius of the vehicle.

In the rear wheel steering portion of a four-wheel steering system, an electric motor is typically employed to steer the rear wheels. Attempting to turn the rear wheels when the vehicle is substantially stopped (or when the steered wheels are otherwise static and not rolling) places high torque loads on the electric motor. This is referred to as "static steering." Accommodating such high torque loads mandates the utilization of larger motors, requiring larger size and weight, and may result in less precise control.

On the one hand, certain steering systems may in fact provide sufficient torque so as to allow the rear wheels to be turned while the vehicle is not moving. Delphi's production QUADRASTEER™ system is one example of such a steering system. Because systems of this type are powerful enough to enable static steering, they generally do not incorporate measures to avoid or prevent static steering.

However, other newer active rear steering systems have been designed to work on passenger vehicles and, as a result, have been designed with only enough power to steer the rear wheels during dynamic maneuvers (i.e., maneuvers that take place at speeds significantly above static steering speeds). For systems of this type, there is therefore a need for properly controlling the rear wheels to avoid attempting static steering and prevent high current in the low-power motor. In this manner, any overheating, demagnetization, and/or other damage that might cause a permanent system failure may be avoided.

SUMMARY

The foregoing discussed drawbacks and deficiencies of the prior art are overcome or alleviated by a method for implementing anti-static steering for vehicle steering systems. In an exemplary embodiment, the method includes receiving a desired rear wheel angle input and receiving a vehicle speed input. An approved rear wheel angle output is generated using the desired rear wheel angle input and the vehicle speed input, wherein the approved rear wheel angle is based upon one of a plurality of defined operating states, the plurality of operating states including operation at a speed in a first range, operation at a speed in a second range, and transitions therebetween.

In another embodiment, a controller for implementing anti-static steering for vehicle steering systems includes an algorithm configured for receiving a desired rear wheel angle as a first input thereto, and a vehicle speed input as a second input thereto. The algorithm is further configured to generate an approved rear wheel angle output using the desired rear wheel angle input and the vehicle speed input, wherein the approved rear wheel angle is based upon one of a plurality of defined operating states, the plurality of operating states including operation at a speed in a first range, operation at a speed in a second range, and transitions therebetween.

In still another embodiment, a vehicle steering system includes a steering mechanism having a steering rack linked to a tie rod, and a motor operably connected to the steering rack through a drive mechanism. A controller is in signal communication with the motor, the controller further including an anti-static steering algorithm configured for receiving a desired rear wheel angle as a first input thereto, and a vehicle speed input as a second input thereto. The algorithm is further configured to generate an approved rear wheel angle output using the desired rear wheel angle input and the vehicle speed input, wherein the approved rear wheel angle is based upon one of a plurality of defined operating states, the plurality of operating states including operation at a speed in a first range, operation at a speed in a second range, and transitions therebetween.

In still another embodiment, a storage medium includes a machine readable computer program code for implementing anti-static steering for vehicle steering systems, and instructions for causing a computer to implement a method. The method further includes receiving a desired rear wheel angle input and receiving a vehicle speed input. An approved rear wheel angle output is generated using the desired rear wheel angle input and the vehicle speed input, wherein the approved rear wheel angle is based upon one of a plurality of defined operating states, the plurality of operating states including operation at a speed in a first range, operation at a speed in a second range, and transitions therebetween.

BRIEF DESCRIPTION OF THE DRAWINGS

Referring to the exemplary drawings wherein like elements are numbered alike in the several Figures.

DETAILED DESCRIPTION

Disclosed herein is a method and system for anti-static steering for vehicle steering systems. Briefly stated, an anti-static steering algorithm is used to generate an allowed rear wheel angle, based upon a desired rear wheel angle (as may be generated by existing system algorithms) and a vehicle speed as inputs thereto. Defined within the algorithm are a plurality of operating states and conditions for transitions between the states, the states being used to determine the output allowed rear wheel angle.

Figure 1:
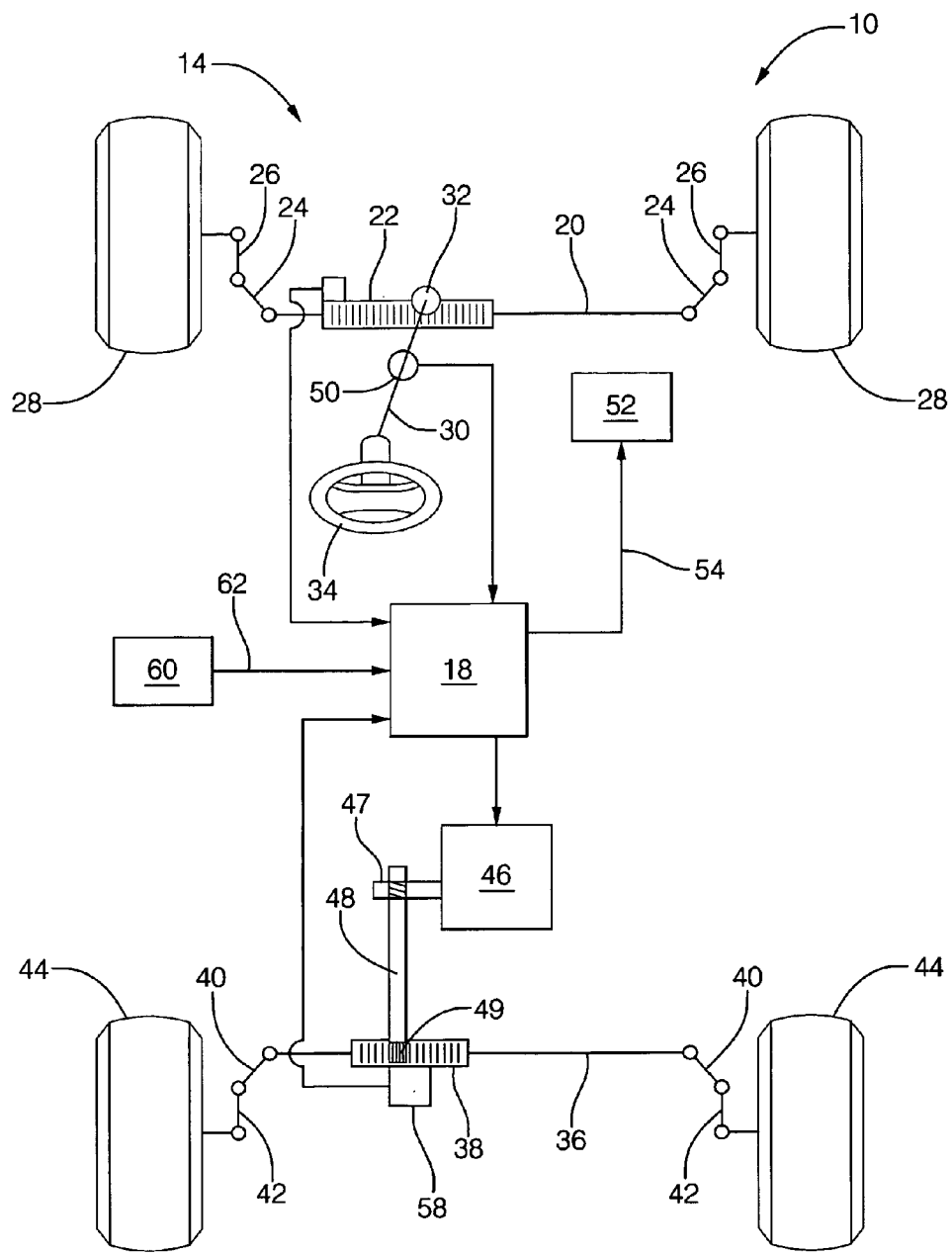
FIG. 1 is a schematic diagram of an exemplary vehicular four-wheel steering system, suitable for use in connection with an embodiment of the invention.

Referring initially to FIG. 1, there is shown an exemplary vehicular four-wheel steering system 10, suitable for use in connection with an embodiment of the invention. However, it should be appreciated that the anti-static steering methodology described hereinafter is equally applicable to other types of steering systems where a steering action is a concern for low vehicle speeds including, but not limited to, rear wheel steering systems, independent rear wheel steering systems, front steering systems, active front steering systems, and steer-by-wire systems. As is shown, the exemplary steering system 10 includes a controller 18 coupled to various sensors and interfaces for performing a variety of processes prescribed by the desired controlling functions.

The system 10 is incorporable into a vehicle (not shown) in order to provide enhanced steering and directional control of the vehicle, and includes a front steering mechanism, shown generally at 14, a rear steering mechanism, shown generally at 16, each in signal communication with controller 18. Although the system 10 is depicted in the context of a rack and pinion steering arrangement, it will be understood that the system 10 is further adaptable to other steering arrangements including, for example, integral gear steering systems.

The front steering mechanism 14 includes a rack shaft 20, a rack 22 disposed intermediately between opposing ends of the rack shaft 20, a tie rod 24 disposed on each opposing end of the rack shaft 20, a knuckle arm 26 connected to each tie rod 24, and a front steerable wheel 28 rotatably disposed on each knuckle arm 26. The rack shaft 20, tie rods 24, and knuckle arms 26 are configured such that the front steerable wheels 28 can pivot in unison relative to the vehicle to steer or to effect a change in the direction of travel while the vehicle is moving.

In addition, the front steering mechanism 14 further includes a mechanism through which a vehicle operator can effectuate a desired change in the direction of travel of the vehicle. More specifically, a steering column 30 is disposed in operable communication at one end thereof with the rack 22 through a pinion 32, and at an opposing end thereof with a steering device 34. The steering device 34 may be a hand steering wheel, or "handwheel". Manipulation of the steering device 34 (i.e., rotation of the handwheel) causes axial rotation of the steering column 30, which in turn causes the rotation of the pinion 32. Rotation of the pinion 32, through the engagement of the rack 22 and the pinion 32, effectuates the lateral translation of the rack 22 relative to the vehicle. The lateral translation of the rack 22 causes the front steerable wheels 28 to angle relative to the vehicle, thereby altering the direction of travel while the vehicle is moving.

The rear steering mechanism 16 further includes a rack shaft 36, a rack 38 disposed intermediately between opposing ends of the rack shaft 36, tie rods 40 disposed on each opposing end of the rack shaft 36, a knuckle arm 42 connected to each tie rod 40, and a rear steerable wheel 44 rotatably disposed on each knuckle arm 42. The rack shaft 36, tie rods 40, and knuckle arms 42 are configured such that rear steerable wheels 44 (like the front steerable wheels 28) may be pivoted in unison relative to the vehicle to steer the vehicle upon lateral translation of the rack 38.

In addition, the rear steering mechanism 16 further comprises a mechanism through which the rear steerable wheels 44 can similarly be pivoted. More specifically, a motor 46 is operably connected to the rack 38 through a drive mechanism 48. The drive mechanism 48, through a pinion 49, transfers the rotational motion of a rotor shaft 47 of the motor 46 to linear motion of the rack 38, which effectuates the lateral motion of the rack shaft 36 and, ultimately, the pivoting of the rear steerable wheels 44.

The vehicle is further provided with a steering sensor 50 for detecting an angular position of the steering column 30, a vehicle speed sensor or speed measurement system 52, and a rear rack shaft displacement sensor 58. The rear rack shaft displacement sensor 58 detects the displacement of its corresponding rack shaft 36 from a reference position, which is the position in which each rear steerable wheel 44 is aligned and rotatable.

As indicated above, the controller 18 is disposed in signal communication with the various systems of the vehicle. In particular, the controller 18 receives informational signals from each of the systems, quantifies the received information, and provides an output command signal in response thereto, such as in this example, to the rear steering mechanism 16 through the motor 46. In order to perform the prescribed functions and desired processing, as well as the associated computations therewith, (e.g., the execution of the rear wheel steering algorithms, and the like), the controller 18 may include, but need not be limited to, processors, computers, memory, storage, registers, timing devices, interrupts, communication interfaces, input/output signal interfaces, and the like. A computer-readable storage media 60 may also be provided for storing computer executable code to implement the functions and processing of the controller, the stored code capable of being accessible by the controller through a data signal 62 transmitted over a transmission medium, such as over electrical wiring or cabling, fiber optics, or via electromagnetic radiation, for example.

Figure 2:
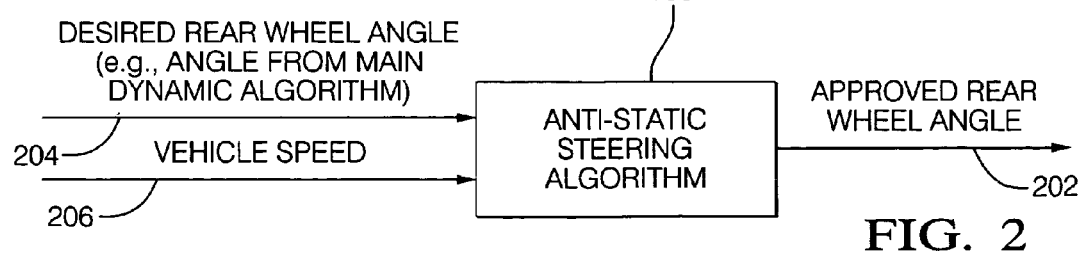
FIG. 2 is a high level block diagram of an algorithm for anti-static steering for four-wheel steering systems, in accordance with an embodiment of the invention.
Figure 3:
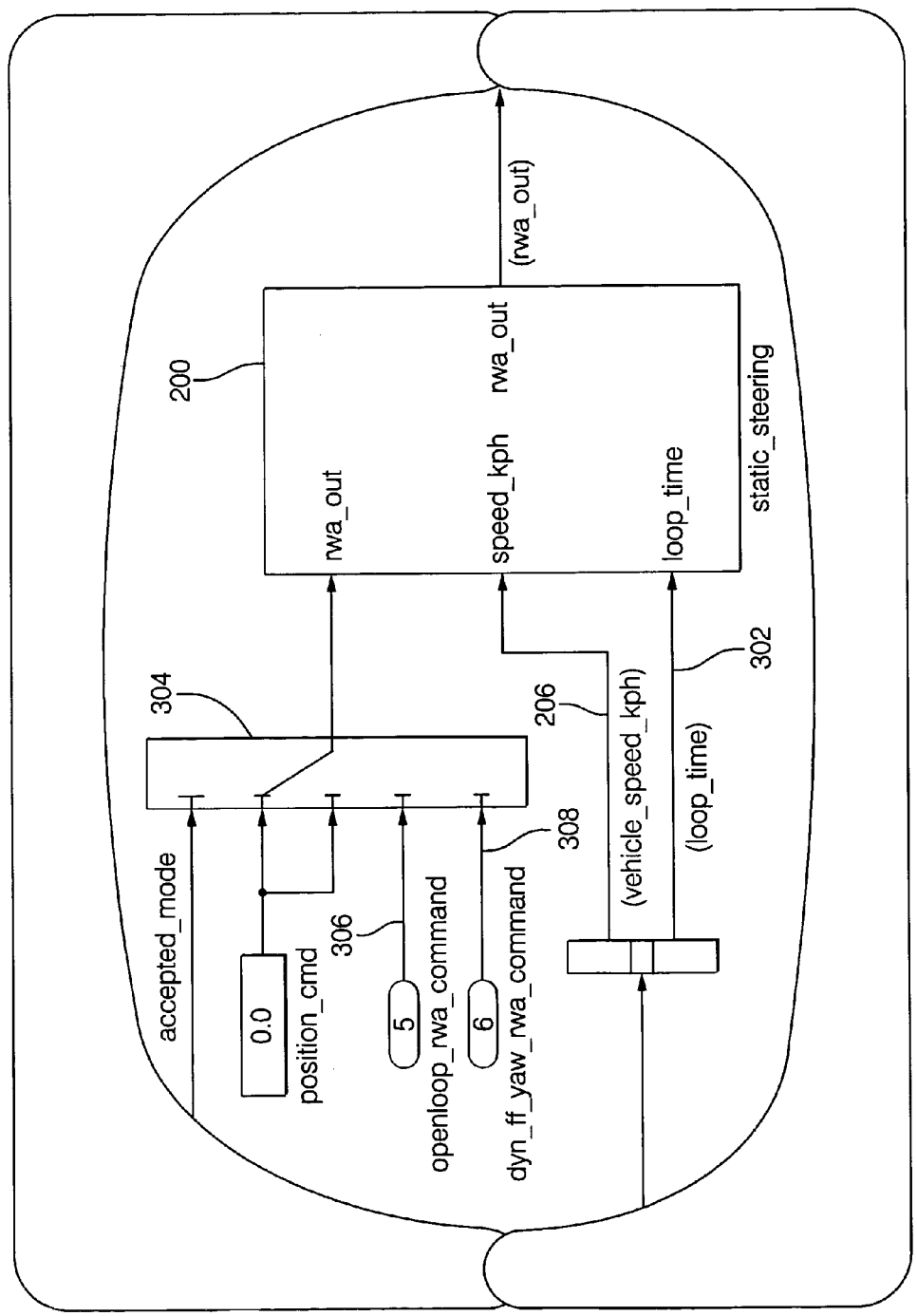
FIG. 3 is a more detailed block diagram of the algorithm shown in FIG. 2.

Referring generally now to FIGS. 2 and 3, there is shown a high level representation of a method for anti-static steering for four-wheel steering systems, in accordance with an embodiment of the invention, such as may be implemented as one or more of several process executed by controller 18 of FIG. 1. As is particularly illustrated in FIG. 2, an anti-static steering algorithm 200 is used to generate an approved rear wheel angle signal, using a generated desired rear wheel angle signal 204 and a vehicle speed signal 206. The desired rear wheel angle 204 inputted to the anti-static steering algorithm 200 may be determined by any of a number of existing algorithms associated with steering systems such as four-wheel steering (e.g., the dynamic feedforward algorithm disclosed in U.S. Pat. No. 6,546,324, the open-loop algorithm disclosed in U.S. Pat. No. 6,564,131, and the open and closed-loop control of U.S. Pat. No. 4,842,089 and U.S. Pat. No. 6,640,171, the contents of which are incorporated herein by reference in their entirety). The approved rear wheel angle is then sent to a servo control portion of the steering system (e.g., controller 18) as the actual desired rear wheel angle to be tracked.

FIG. 3 is a more detailed high level diagram of the static steering algorithm 200 of FIG. 2, in which the vehicle speed signal 206 is also used in connection with a loop time signal 302 in the event it is desired to use the rate of change of the speed signal for certain parameter calculations (an example of which is discussed hereinafter). A switch 304 is also depicted in FIG. 3 to illustrate that the static steering algorithm may be readily incorporated into an existing steering system, such as one providing one or more methodologies for generating a desired rear wheel angle signal (e.g., open-loop signal 306 or dynamic feedforward signal 308).

Figure 4:
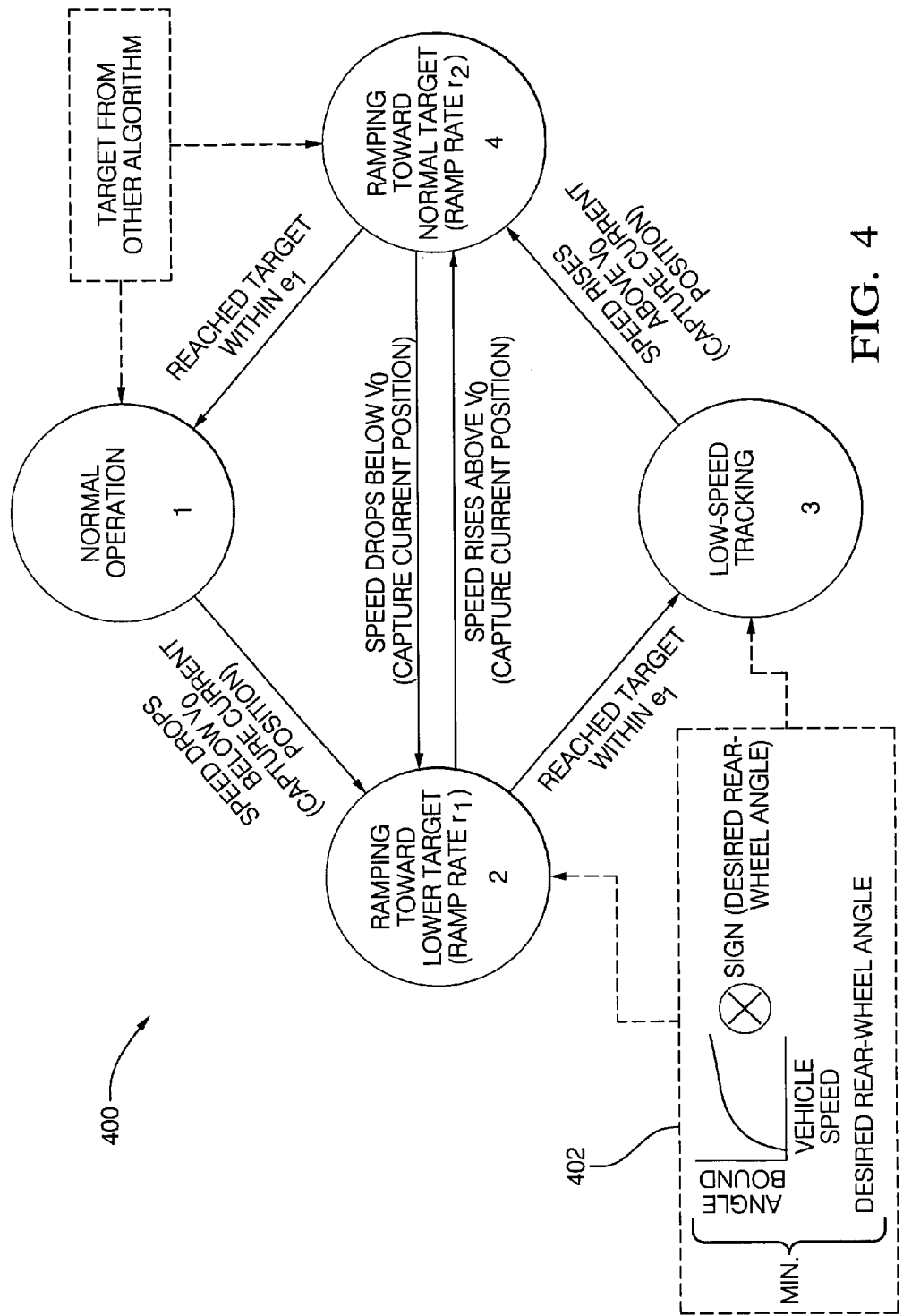
FIG. 4 is a state diagram illustrating a plurality of defined operational states associated with the anti-static steering algorithm.

The implementation of the anti-static steering algorithm 200 is based upon the definition of four vehicle operational states, and the conditions for allowable transitions therebetween. As shown in the state diagram 400 of FIG. 4, a first defined state (State 1) is a state of normal operation, in which the desired rear wheel angle signal 204 is directly passed through the algorithm 200 as the approved rear wheel angle 202. This is generally the mode in which the steering system operates while the vehicle is moving at a speed at or above an adjustable threshold, $v_0$. In other words, since the vehicle is moving at a determined sufficient speed, the generated desired rear wheel angle may be passed directly through the algorithm since this threshold speed is considered not to present the above described problem of placing a high-torque load on the steering motor. Thus, when the vehicle is operating in State 1, the output of the algorithm 200 may be expressed as follows:

> approved rear wheel angle=desired rear wheel angle

When the vehicle speed drops below this adjustable threshold ($v_0$), the system switches states to a second defined state (State 2—Ramping Toward Lower Target). As soon as the algorithm 200 determines a transition to this state, it initially captures the current value of the desired rear wheel angle 204. Then, the value of the approved rear wheel angle 202 is ramped towards a new target value at a rate of $r_1$, starting from the initially captured value. In an exemplary embodiment, the magnitude of this new target value is the minimum of the absolute value of the desired rear wheel angle 204 and the output of a table whose input is vehicle speed and whose output is a bounding value of the approved angle. The sign of the new target value is determined by the sign of the desired rear wheel angle. Generally, the output of the table is monotonically increasing with respect to input speed. However, in order to avoid static steering, the table preferably has an output value of zero for small input values (as depicted in the insert 402 shown in FIG. 4). The output of the table is then multiplied by the sign of the desired rear wheel angle to determine the target value. When the vehicle is operating in State 2, the output of the algorithm 200 may be expressed as follows:

> approved rear wheel angle=output of the ramp to table-bounded angle when magnitude of the output is less than the magnitude of the desired rear wheel angle; or the desired rear wheel angle otherwise.

When the approved rear wheel angle 202 reaches the new low speed target within an adjustable threshold error angle, $e_1$, the algorithm 200 transitions into a third defined state (State 3—Low-Speed Tracking). During this state, the magnitude of the approved rear wheel angle 202 is bounded by the table, with the sign thereof controlled by the sign of the desired rear wheel angle 204. If the table has zero output for small inputs, then the approved rear wheel angle will be zero. When the vehicle is operating in State 3, the output of the algorithm 200 may be expressed as follows:

> approved rear wheel angle=table-bounded desired rear wheel angle

If the vehicle speed then rises above the same adjustable threshold ($v_0$) while operating in State 3, the algorithm 200 transitions to a fourth defined state (State 4—Ramping Toward Normal Target) and captures the current approved rear wheel angle value 202. During this state, the approved rear wheel angle is ramped toward the incoming desired target rear wheel angle 204 at a rate of $r_2$. It will be noted that the ramp rate $r_2$ of State 4 is independently controllable and adjustable with respect to the ramp rate $r_1$ of State 2. The output of algorithm 200 in this fourth state of operation may be expressed as follows:

> approved rear wheel angle=ramp(to desired incoming rear wheel angle)

Furthermore, while in State 4, if the output of the ramp reaches the incoming target value, the system will then transition to State 1, in which the incoming desired rear wheel angle is directly passed through as the approved rear wheel angle.

In addition to the state transition sequences described above (i.e., State 1 to State 2; State 2 to State 3; State 3 to State 4; and State 4 to State 1), two other acceptable state transitions may also occur. While operating in State 2 (Ramping Towards Lower Target), it is possible for the vehicle speed to rise above $v_0$. If this situation occurs, the algorithm 200 will then transition directly from state 2 to state 4 (and begin ramping towards the incoming target rear wheel angle). Conversely, while in State 4, it is possible for the vehicle speed to drop below $v_0$. In this situation, the algorithm 200 will transition directly from state 4 to state 2 (and begin ramping towards the lower target value).

One the other hand, transitions from State 1 to State 3 and from State 3 to State 1 are not allowed in the embodiment depicted. These prohibited state transitions are avoided in order to allow for smooth transitions in the rear wheel angle tracking. In other words, whereas State 1 and State 3 may be characterized as "steady" states (normal operation, low speed operation), the advantage of defining State 2 and State 4 is to provide a smooth transition from a state of directly passing the desired rear wheel angle through the algorithm 200 (State 1) to using a bounded rear wheel angle as the output of algorithm 200 (State 3).

It will be appreciated that the state transition parameters described above are presented by way of example only, and certain parameter variations are also contemplated. For instance, the speed threshold for transitions from State 1 to State 2, State 3 to State 4, State 2 to State 4, and State 4 to State 2 may all differ from one another. Whereas the above described embodiment utilizes the same speed threshold ($v_0$) for each defined state transition, it is also possible to use varying thresholds if appropriate hysteresis is used. Furthermore, the established speed threshold for the various transitions may also depend on the rate of change of the vehicle speed (i.e., acceleration/deceleration). Faster rates of change may justify an earlier transition into State 2, for example, to assure that the approved rear wheel angle reaches a near zero value before the vehicle reaches zero speed.

In addition, the table used for bounding the low-speed rear wheel angle values may be replaced by a function of several variables including, but not limited to, the rate of change of vehicle speed. Similarly, the ramp rates $r_1$ and $r_2$ may also be functions the rate of change of vehicle speed, or other appropriate variables.

Figure 5:
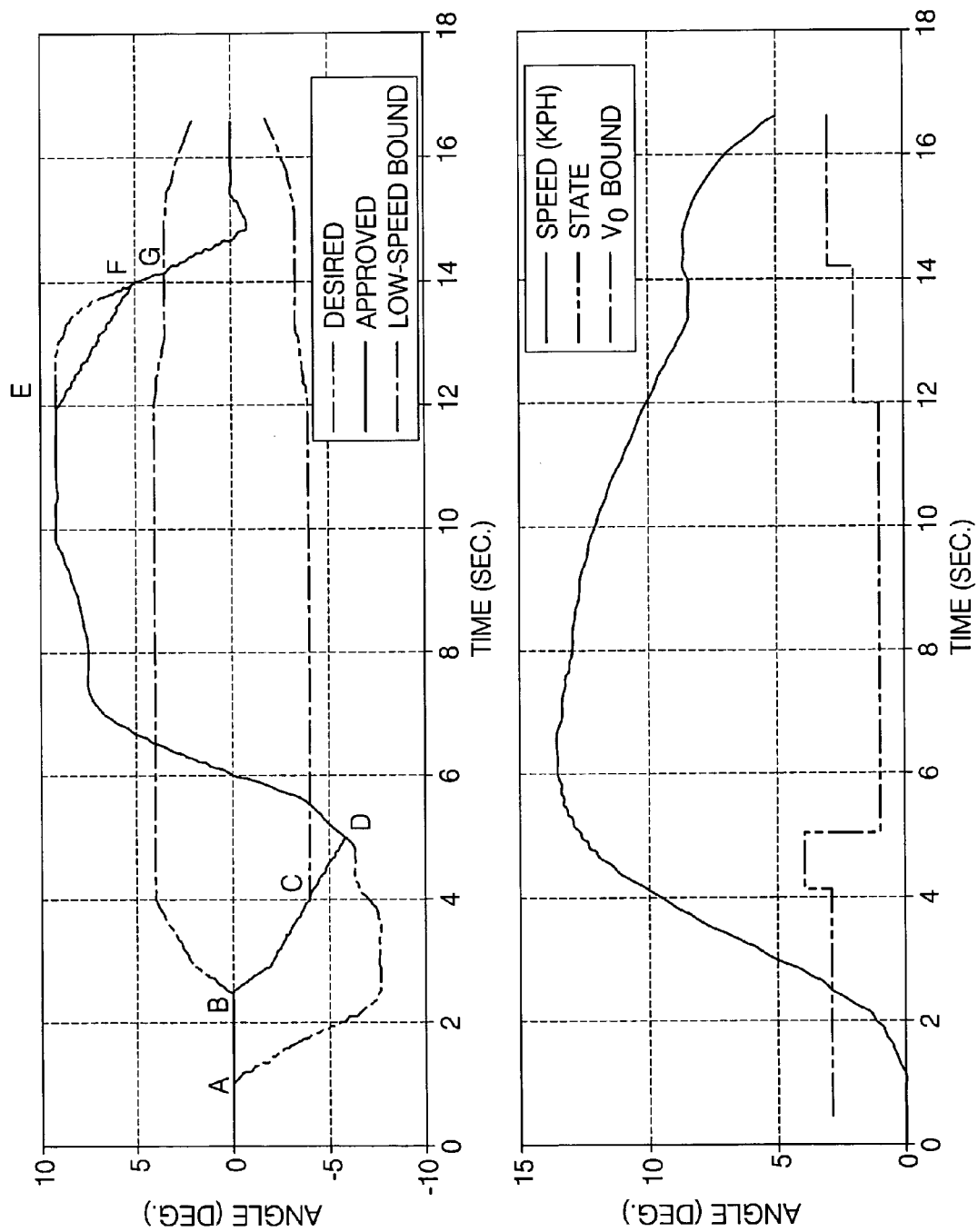
FIG. 5 is graph illustrating an example of the execution of the anti-static steering algorithm.

Finally, FIG. 5 is a graph 500 illustrating an example of the execution of the anti-static steering algorithm 200. The upper portion of the graph 500 tracks the desired rear wheel angle, the low-speed bounds for the rear wheel angle, and the approved rear wheel angle over time, while the lower portion of the graph 500 tracks the vehicle speed and algorithm state over time. In the example depicted, the vehicle starts at speed of zero, and the algorithm is already settled into State 3. At about the time t=1 second, the anti-static steering algorithm receives a request for a non-zero desired rear wheel angle (RWA), as indicated by point A on the graph. However, since the vehicle speed at point A is still zero, the output of the bounding table used by the algorithm is also zero so as to prevent static steering. Therefore, the output of the algorithm (i.e., the approved rear wheel angle) remains zero.

At point B on the graph, the symmetric output of the bounding table becomes non-zero and starts to increase in magnitude as a result of the increase in vehicle speed from the initial zero value. Since the vehicle is still in the low-speed tracking state (State 3), and since the desired RWA is still greater in magnitude than the bounded value, the approved RWA remains limited by the magnitude of the bound.

However, at point C on the graph 500 (just after t=4 seconds), it will be seen that the vehicle speed has now risen above the established threshold $v_0$, which is set to about 10 kph in the example illustrated. The algorithm therefore transitions from State 3 to State 4 (shown in the lower portion of the graph 500). During State 4, it will be recalled that the approved RWA ramps towards the desired RWA, as further reflected by the deviation of the approved RWA from the bounded value after point C. Once the ramped value of the approved RWA reaches the desired RWA within the tolerance $e_1$, the algorithm transitions to State 1, as shown at point D. Because the vehicle speed remains above the threshold value $v_0$ for several seconds after point D, the approved RWA simply tracks the desired RWA up until about time t=12 seconds.

However, as shown at point E, the vehicle speed has now dropped below the established threshold $v_0$, and thus the algorithm transitions to State 2. It will be recalled that during State 2, the approved RWA is ramped down towards the lower, speed-dependent bounded value. Then, at point F, the desired RWA is now lower than the output of the ramp and thus the algorithm causes the approved RWA to track the desired RWA (so long as the desired RWA remains less than the ramp value in this state). As finally shown at point G in FIG. 6, once the approved RWA falls back within the speed-dependent bounded value, the algorithm transitions back to State 3 in which the approved RWA continues to track the desired RWA since the magnitude of the desired RWA is within the bounded value.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing anti-static steering for vehicle steering systems, the method comprising:
   receiving a desired rear wheel angle input;
   receiving a vehicle speed input; and
   generating an approved rear wheel angle output using said desired rear wheel angle input and said vehicle speed input;
   wherein said approved rear wheel angle is based upon one of a plurality of defined operating states, said plurality of operating states including operation at a speed in a first range, operation at a speed in a second range, and transitions therebetween.

2. The method of claim 1, wherein said plurality of operating states further comprises:
   a first state in which said approved rear wheel angle is equal to said desired rear wheel angle;
   a second state in which said approved rear wheel angle is ramped toward a lower target value at a first ramp rate;
   a third state in which said approved rear wheel angle is equal to one of a said lower target value and said desired rear wheel angle; and
   a fourth state in which said approved rear wheel angle is ramped toward a said desired rear wheel angle at a second ramp rate.

3. The method of claim 2, wherein said first state is characterized by a vehicle speed at or above a predetermined threshold value.

4. The method of claim 2, wherein said second state is characterized by a vehicle speed dropping below a predetermined threshold value.

5. The method of claim 4, further comprising:
   upon a transition to said second state from one of said first state and said fourth state, capturing a current value of said desired rear wheel angle; and
   generating said approved rear wheel angle by determining a minimum value of: a ramp value to said lower target value, and said desired rear wheel angle;
   wherein the target of said ramp value comprises an output of a table, said output of said table a function of said vehicle speed input.

6. The method of claim 2, wherein said third state is characterized by bounding said approved rear wheel angle to the magnitude of said lower target value.

7. The method of claim 6, wherein, for said third state, said approved rear wheel angle is set to a minimum value of: said desired rear wheel angle and said lower target value.

8. The method of claim 7, wherein said lower target value is determined from an output of a table, said output of said table a function of said vehicle speed input.

9. The method of claim 8, further comprising:
   upon a transition to said fourth state from one of said second state and said third state, capturing a current value of said desired rear wheel angle; and
   setting said approved rear wheel angle to a ramping value toward said desired rear wheel angle, said ramping value comprising an output of a table, said output of said table being a function of said vehicle speed input; and
   transitioning from said fourth state to said first state once said ramping value reaches desired rear wheel angle.

10. The method of claim 2, wherein said fourth state is characterized by a vehicle speed increasing to at least a predetermined threshold value.

11. The method of claim 2, wherein said first and said second ramp rates are a function of rate of change of said vehicle speed input.

12. The method of claim 2, further comprising establishing one or more speed threshold values for transitioning between said plurality of operating states.

13. The method of claim 12, wherein said one or more speed threshold values are a function of rate of change of said vehicle speed input.

14. A controller for implementing anti-static steering for vehicle steering systems, comprising:

an algorithm configured for receiving a desired rear wheel angle as a first input thereto, and a vehicle speed input as a second input thereto;

said algorithm further configured to generate an approved rear wheel angle output using said desired rear wheel angle input and said vehicle speed input;

wherein said approved rear wheel angle is based upon one of a plurality of defined operating states, said plurality of operating states including operation at a speed in a first range, operation at a speed in a second range, and transitions therebetween.

15. The controller of claim 14, wherein said plurality of operating states further comprises:
a first state in which said approved rear wheel angle is equal to said desired rear wheel angle;
a second state in which said approved rear wheel angle is ramped toward a lower target value;
a third state in which said approved rear wheel angle is equal to one of a said lower target value and said desired rear wheel angle; and
a fourth state in which said approved rear wheel angle is ramped toward a said desired rear wheel angle.

16. The controller of claim 15, wherein said first state is characterized by a vehicle speed at or above a predetermined threshold value.

17. The controller of claim 15, wherein said second state is characterized by a vehicle speed dropping below a predetermined threshold value.

18. The controller of claim 17, wherein:
upon a transition to said second state from one of said first state and said fourth state, said algorithm captures a current value of said desired rear wheel angle; and
said algorithm generates said approved rear wheel angle by determining a minimum value of: a ramp value to said lower target value, and said desired rear wheel angle;
wherein said ramp value comprises an output of a table, said output of said table a function of said vehicle speed input.

19. The controller of claim 15, wherein said third state is characterized by bounding said approved rear wheel angle to the magnitude of said lower target value.

20. The controller of claim 19, wherein, for said third state, said approved rear wheel angle is set to a minimum value of: said desired rear wheel angle and said lower target value.

21. The controller of claim 20, wherein said lower target value is determined from an output of a table, said output of said table a function of said vehicle speed input.

22. The controller of claim 15, wherein said fourth state is characterized by a vehicle speed increasing to at least a predetermined threshold value.

23. The controller of claim 21, wherein:
upon a transition to said fourth state from one of said second state and said third state, said algorithm captures a current value of said desired rear wheel angle; and
said algorithm sets said approved rear wheel angle to a ramping value toward said desired rear wheel angle, said ramping value comprising an output of a table, said output of said table being a function of said vehicle speed input; and
said algorithm transitions from said fourth state to said first state once said ramping value reaches desired rear wheel angle.

24. The method of claim 15, wherein said first and said second ramp rates are a function of rate of change of said vehicle speed input.

25. The method of claim 15, further comprising establishing one or more speed threshold values for transitioning between said plurality of operating states.

26. The method of claim 25, wherein said one or more speed threshold values are a function of rate of change of said vehicle speed input.

27. A vehicle steering system, comprising:
a steering mechanism including a steering rack linked to a tie rod;
a motor operably connected to said steering rack through a drive mechanism; and
a controller in signal communication with said motor, said controller further comprising:
an anti-static steering algorithm configured for receiving a desired rear wheel angle as a first input thereto, and a vehicle speed input as a second input thereto;
said algorithm further configured to generate an approved rear wheel angle output using said desired rear wheel angle input and said vehicle speed input;
wherein said approved rear wheel angle is based upon one of a plurality of defined operating states, said plurality of operating states including operation at a speed in a first range, operation at a speed in a second range, and transitions therebetween.

28. The vehicle steering system of claim 27, wherein said plurality of operating states further comprises:
a first state in which said approved rear wheel angle is equal to said desired rear wheel angle;
a second state in which said approved rear wheel angle is ramped toward a lower target value;
a third state in which said approved rear wheel angle is equal to one of a said lower target value and said desired rear wheel angle; and
a fourth state in which said approved rear wheel angle is ramped toward a said desired rear wheel angle.

29. A storage medium, comprising:
a machine readable computer program code for implementing anti-static steering for vehicle steering systems; and
instructions for causing a computer to implement a method, the method further comprising:
receiving a desired rear wheel angle input;
receiving a vehicle speed input; and
generating an approved rear wheel angle output using said desired rear wheel angle input and said vehicle speed input;
wherein said approved rear wheel angle is based upon one of a plurality of defined operating states, said plurality of operating states including operation at a speed in a first range, operation at a speed in a second range, and transitions therebetween.

30. The storage medium of claim 29, wherein said plurality of operating states further comprises:
a first state in which said approved rear wheel angle is equal to said desired rear wheel angle;
a second state in which said approved rear wheel angle is ramped toward a lower target value;
a third state in which said approved rear wheel angle is equal to one of a said lower target value and said desired rear wheel angle; and
a fourth state in which said approved rear wheel angle is ramped toward a said desired rear wheel angle.

* * * * *